No. 745,892. Patented December 1, 1903.

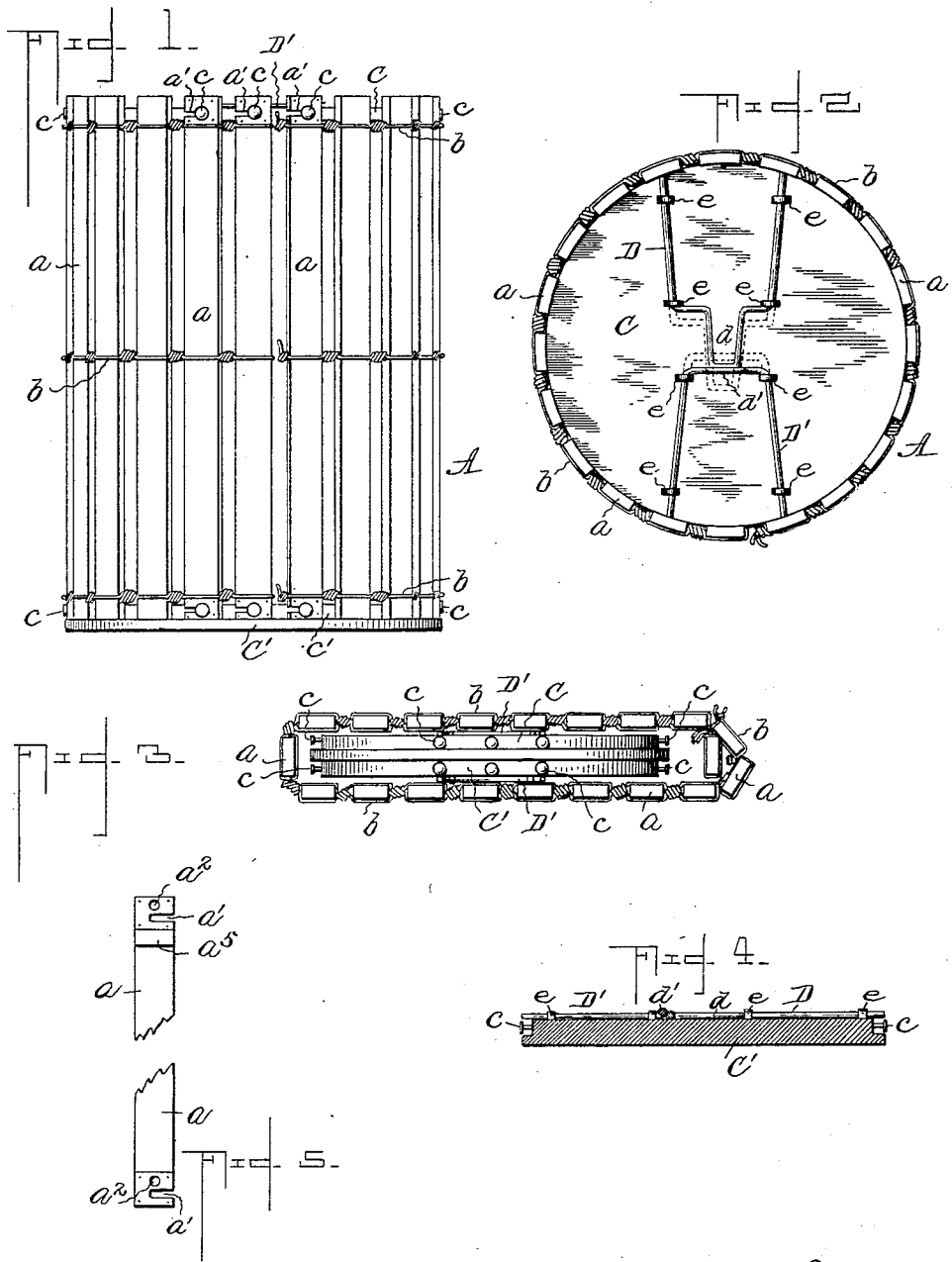

UNITED STATES PATENT OFFICE.

WILLIAM H. ORR, OF CORPUS CHRISTI, TEXAS, ASSIGNOR OF ONE-HALF TO JOHN McCLANE, OF CORPUS CHRISTI, TEXAS.

COLLAPSIBLE CRATE.

SPECIFICATION forming part of Letters Patent No. 745,892, dated December 1, 1903.

Application filed March 21, 1903. Serial No. 148,882. (No model.)

*To all whom it may concern:*

Be it known that I, WILLIAM H. ORR, a citizen of the United States, and a resident of Corpus Christi, in the county of Nueces and State of Texas, have invented a Collapsible Crate, of which the following is a specification.

The object of this invention is to provide a barrel-shaped crate in which the top and bottom pieces or heads can be readily detached from the sides and the parts folded to occupy comparatively little space for convenience in shipping the empty crate back to the producer.

A further object of the invention is to provide a collapsible crate of this character in which the body is made up of strips separated from each other, so that the said crate is especially adapted for shipping fruit or vegetables of that class which require plenty of air; but though I have shown this form of crate it will be obvious that the strips forming the sides may be more closely connected to provide a tight crate or box.

A further object of the invention is to provide a collapsible crate in which the bottom and top pieces or heads are securely connected to the sides to produce a very strong structure and at small expense.

With these objects in view the invention consists of a crate made up of flexibly-connected strips forming the body and connected by top and bottom pieces or heads and spring-wire loops for securing the heads to the sides, all as will be hereinafter fully described, and more specifically stated in the appended claims.

In the drawings, Figure 1 is a side elevation of a crate constructed in accordance with my invention. Fig. 2 is a plan view. Fig. 3 is a view showing the parts folded or arranged for reshipment empty. Fig. 4 is a sectional view through the bottom of the crate and catches thereon. Fig. 5 is a detail view of one of the strips forming the flexible body of the crate.

Like letters of reference indicate like parts in the several views of the drawings.

A designates the body of the crate, which is composed of a number of strips $a$, connected together by wires $b$ after the manner of connecting the panels of a fence—that is to say, the wires extend across opposite sides of the strip and are twisted between said strips to separate them the desired distance, the spacing apart being determined by the number of twists or coils. This produces a series of flexibly-connected strips which may be either folded, as shown in Fig. 3, or rolled up for transportation or reshipment and which when desired for use may be arranged, as shown in Figs. 1 and 2, to form the body of a barrel-shaped crate or otherwise arranged to form the sides of a box. Several of these strips $a$ are provided near their opposite ends with slots $a'$, extending from one side, and with which slots are adapted to engage headed pins $c$, projecting from the periphery of the top and bottom pieces or heads C and C', respectively, and some of said strips are also provided with holes or recesses $a^2$, with which engage spring-wire catches D, carried by the heads and hereinafter described.

The head C is simply a disk, and the head C' is similar in shape and thicker and provided with a circumferential recess $c'$, in which the lower ends of the strips $a$ are stepped. It is obvious, however, that both ends of the crate may be the same—that is, like either the top C or the bottom C'—and it is apparent that if both were constructed like the bottom C' a stronger and more rigid structure would be produced.

The catches for securing the top and bottom to the sides are exactly alike, and therefore a description of one set will also answer for the other, the same letters of reference being employed in both. These catches consist of two spring-wire loops D D', the ends of which are adapted to be projected beyond the edges of the top and bottom to engage the holes or recesses $a^2$ in the strips $a$. These spring-wire loops are slidably held upon the top and bottom pieces by means of staples $e$, which latter may also serve to limit the movement of said loops. The loop D is contracted at its inner end, forming, practically, a tongue $d$, while the adjoining end of the companion loop is bent upward slightly, as at $d'$, so that the end of the tongue may spring into locked engagement therewith. It will be noted by reference to Fig. 2 that when the loops are slid inward after first slightly elevating the tongue $d$ the inner ends of said loops will overlap each other. This will bring the ends of the loops at the edge of the heads, so that the latter may be inserted in the sides of the crate, and after engaging said sides with the headed pins $c$ the wire loops may be slid forward to engage the holes or recesses $a^2$ in the sides, and when moved into such engagement the inner end of the tongue $d$ will spring down into engagement with the inner end of the other loop, practically locking the parts, the ends of the loops yielding sufficiently to accomplish this purpose.

The ends of the strips having the slots and holes or recesses may be protected by wear-plates, as indicated in the drawings, and a few of the strips may be also provided with blocks $a^5$, (see Fig. 5,) against which the heads may abut.

The flexibly-connected strips forming the sides of the crate may be folded upon the heads, as shown in Fig. 3, or may be rolled up, and when so arranged will occupy but little space, and when it is desired to make up the crate it is only necessary to pass the connected strips around the heads and after placing them in engagement with the headed pins operate the catches to secure the parts.

Having thus described my invention, what I claim is—

1. In a collapsible crate, the combination, of the body composed of flexibly-connected strips a number of which are provided with open-ended slots and adjacent holes or recesses, heads provided with headed pins adapted to engage the slots and catches comprising spring-wire loops adapted to interlock at their inner looped ends when the outer ends are projected into engagement with the aforesaid holes or recesses, substantially as shown and described.

2. In a collapsible crate, the combination, of the body composed of flexibly-connected strips a number of which are provided with open-ended slots, heads provided with headed pins adapted to engage said slots, and spring-wire loops slidably mounted in line with each other on said heads, one of said loops being contracted at its inner or looped end to form a tongue and the other having a raised portion at its inner or loop end with which the end of the tongue is adapted to engage and lock.

3. In a collapsible crate, the combination, of the body composed of flexibly-connected strips a number of which are provided with slots, heads having circumferential recesses in which the ends of the strips are stepped, headed pins on the heads adapted to engage the slots in the strips, and catches comprising spring-wire loops adapted to interlock at their inner looped ends when the outer ends are projected into engagement with the body of the crate.

WILLIAM H. ORR.

Witnesses:
JOSEPH DUNN,
LAWRENCE DUNNE.